United States Patent
Eom et al.

(10) Patent No.: US 8,722,257 B2
(45) Date of Patent: May 13, 2014

(54) PRESSING-TYPE CYLINDRICAL METAL AIR BATTERY

(75) Inventors: Seung-wook Eom, Changwon-si (KR);
Ke-tack Kim, Changwon-si (KR);
Hyun-soo Kim, Changwon-si (KR)

(73) Assignee: Korea Electrotechnology Research Institute (KR)

( * ) Notice: Subject to any disclaimer, the term of this patent is extended or adjusted under 35 U.S.C. 154(b) by 437 days.

(21) Appl. No.: 13/095,602

(22) Filed: Apr. 27, 2011

(65) Prior Publication Data

US 2011/0212369 A1    Sep. 1, 2011

Related U.S. Application Data

(63) Continuation of application No. PCT/KR2009/007253, filed on Dec. 7, 2009.

(30) Foreign Application Priority Data

Apr. 27, 2009    (KR) .................. 10-2009-0036339

(51) Int. Cl.
*H01M 12/06* (2006.01)
(52) U.S. Cl.
USPC .......................................................... 429/407
(58) Field of Classification Search
USPC .......................................................... 429/407
See application file for complete search history.

(56) References Cited

U.S. PATENT DOCUMENTS

| 6,274,261 B1 * | 8/2001 | Tinker et al. .................. 429/407 |
| 2005/0058887 A1 | 3/2005 | Richards et al. |

FOREIGN PATENT DOCUMENTS

| WO | 0038266 A1 | 6/2000 |
| WO | 0113456 A1 | 2/2001 |
| WO | 0197317 A1 | 12/2001 |

OTHER PUBLICATIONS

International Search Report (PCT/KR/2009/007253).

* cited by examiner

*Primary Examiner* — Karie Apicella
(74) *Attorney, Agent, or Firm* — Park & Associates IP Law, P.C.

(57) ABSTRACT

The present invention provides a pressing-type cylindrical metal air battery which comprises: an external case which is formed in a cylindrical shape, and has a cathode terminal on one side and an anode terminal hole on the other side; an internal case which is formed in a cylindrical shape and coaxially inserted into the inside of the external case, has an anode terminal that is inserted into or extracted from the inside or the outside of the anode terminal hole on one side, and has an air inflow hole on the surface of a wall so that air can flow into the air inflow hole; and an elastic sealing means which is formed on the one side of the internal case, enables the air to flow into the anode terminal hole by elastically pressurizing the anode terminal when a battery is inserted into a battery compartment, and seals the anode terminal hole by elastically restoring the anode terminal again if the battery is separated from the battery compartment.

7 Claims, 1 Drawing Sheet

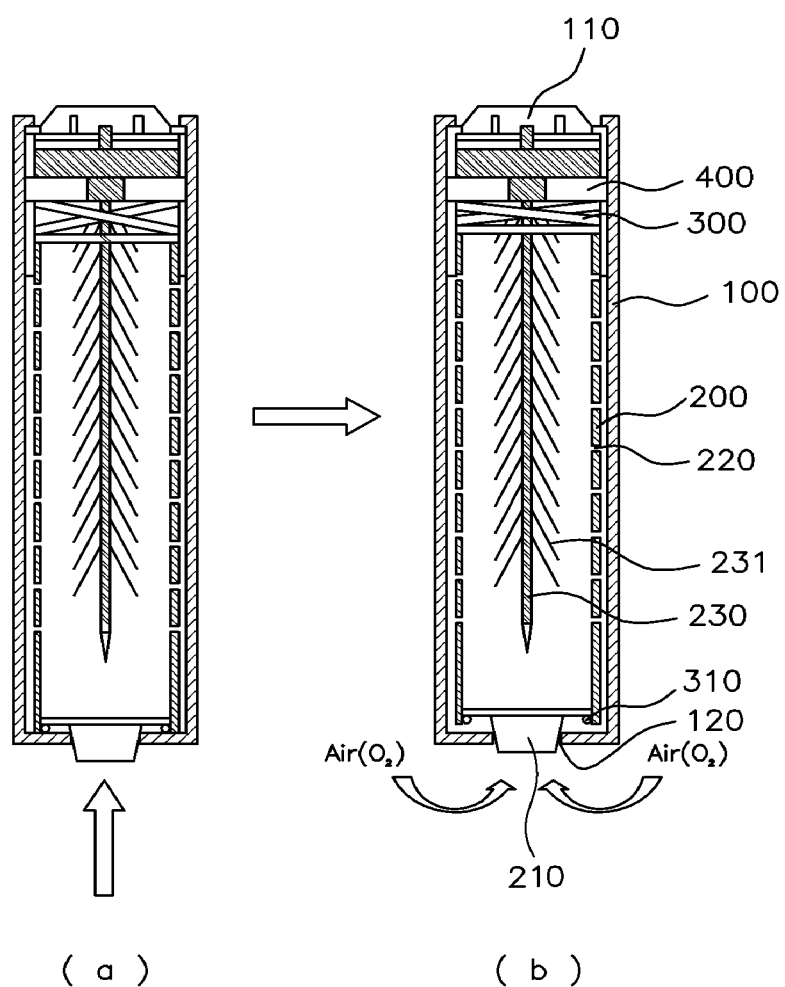

PRESSING-TYPE CYLINDRICAL METAL AIR BATTERY

REFERENCE TO RELATED APPLICATIONS

This is a continuation of pending International Patent Application PCT/KR2009/007253 filed on Dec. 7, 2009, which designates the U.S. and claims priority of Korean Patent Application No. 10-2009-0036339 filed on Apr. 27, 2009, the entire contents of which are incorporated herein by reference.

FIELD OF THE INVENTION

The present invention relates to a high-field anodizing apparatus for forming nanostructures on the surface of metal, and, more particularly, to a high-field anodizing apparatus which can prevent the damage of nanostructures and control the growth rate of nanostructures by controlling the reaction temperature and reaction rate of anodization.

BACKGROUND OF THE INVENTION

Generally, a metal air battery has been widely used for a portable device that needs to be used for a long period of time, for example, a hearing aid, and mainly comprises a primary battery. However, recently, there have been attempts to apply the metal air battery to the latest portable electronic devices, such as mobile phones, PDAs, or notebook PCs, communication devices for military use, and large-capacity charging devices. As such, the availability of the metal air battery has been gradually increasing.

Such a metal air battery uses oxygen contained in air as an anode active material, and uses metal as a cathode active material. The metal air battery includes a separator between the anode and the cathode, thus isolating the anode and the cathode from each other, preventing short-circuiting of current due to the contact between the electrodes, and enabling the passage of metallic ions. The flow of electrons is implemented by an oxidation-reduction reaction between the oxygen and the metal, and the metal used as the cathode is usually immersed in electrolyte in the form of powder.

A conventional metal air battery has a button-type or a coin-type structure which is constructed so that an air cathode is placed in the battery in the form of a flat plate, so that the battery may be restrictively used for a device such as a hearing aid. However, practically, the utilization range of a cylindrical battery is wider. In order to solve the problem, there has recently been active research conducted into a cylindrical metal air battery.

As the prior art, there are Korean U.M. Registration No. 20-0414801, Korean Patent No. 10-0883934, Korean Patent No. 10-0875105, etc., which deal with a cylindrical air-zinc battery.

However, the conventional cylindrical air-zinc battery is problematic in that external air always flows into the air cathode, so that the natural electric discharge of the battery occurs even when the battery is not in use, and thus the storage performance of the battery deteriorates.

SUMMARY OF THE INVENTION

Accordingly, the present invention has been made keeping in mind the above problems occurring in the prior art, and an object of the present invention is to provide a pressing-type cylindrical metal air battery, which has a double structure with an external case and an internal case, so that the internal case can be opened to or sealed from the outside when the battery is inserted into or separated from a battery compartment, thereby blocking the inflow of air when the battery is not in use.

In order to accomplish the above object, the present invention provides a pressing-type cylindrical metal air battery, including an external case formed in a cylindrical shape and having a cathode terminal on a first end thereof and an anode terminal hole on a second end thereof; an internal case formed in a cylindrical shape, coaxially inserted into the external case, and having on a first end thereof an anode terminal which moves into and out of the anode terminal hole, with an air inflow hole being formed in a wall of the internal case to permit inflow of air; and an elastic sealing means provided on a second end of the internal case, thus enabling the air to flow into the anode terminal hole by elastically pressurizing the anode terminal when the battery is inserted into the battery compartment, and thus sealing the anode terminal hole by elastically restoring the anode terminal again when the battery is separated from the battery compartment.

The internal case may further include therein a current collecting bar which is electrically connected to the cathode terminal. A plurality of current collecting needles may be formed on the current collecting bar.

The pressing-type cylindrical metal air battery may further include a support unit provided between the external case and the internal case, supporting the cathode terminal and the current collecting bar while insulating them from the external case, and supporting the elastic sealing means between the support unit and the internal case.

Further, the elastic sealing means may comprise a spring which is provided between a rear end of the internal case and the support unit and is made of an elastic material. The elastic sealing means may further include a sealing member at a position adjacent to the anode terminal of the internal case.

According to the present invention, a pressing-type cylindrical metal air battery is advantageous in that it has a double structure with an external case and an internal case, so that an air inflow hole of the internal case can be opened to or sealed from the outside when the battery is inserted into or separated from a battery compartment, thus easily blocking the inflow of the air when the battery is not in use, and thereby reducing the natural electric discharge of the battery, therefore improving storage performance.

Further, the pressing-type cylindrical metal air battery is advantageous in that it has a current collecting bar which is electrically connected to a cathode terminal, thus increasing current collecting efficiency, thereby enhancing the oxidation-reduction reaction efficiency of the battery, and allowing the reaction to be stably performed.

BRIEF DESCRIPTION OF THE DRAWINGS

FIGS. 1a and 1b are sectional views showing a pressing-type cylindrical metal air battery according to the present invention, in which FIG. 1a shows the battery when it is separated from a battery compartment, and FIG. 1b shows the battery when it is inserted into the battery compartment.

DESCRIPTION OF REFERENCE CHARACTERS OF IMPORTANT PARTS

100: external case
110: cathode terminal
120: anode terminal hole
200: internal case
210: anode terminal 220: air inflow hole
230: current collecting bar
231: current collecting needle
300: elastic sealing means
310: sealing member
400: support unit

DETAILED DESCRIPTION OF THE INVENTION

The present invention has a double structure with an external case and an internal case, so that the internal case internally coming into contact with an anode is opened to or sealed from the outside when a battery is used by inserting it into a battery compartment and when the battery is not in use by separating it from the battery compartment, thus preventing the oxidation-reduction reaction of the battery from occurring when the battery is not in use, and thereby improving the storage performance of the battery.

Hereinafter, a preferred embodiment of the present invention will be described in detail with reference to the accompanying drawings. FIGS. 1a and 1b are sectional views showing a pressing-type cylindrical metal air battery according to the present invention.

The present invention has the general structure of a cylindrical metal air battery, and has the same shape and size as an existing battery, such as an alkaline battery of AA or AAA size. It may have the same shape and size as a large-sized cylindrical or rectangular battery according to circumstances. A description of electrolyte or a separator will be omitted herein.

As shown in the drawing, the pressing-type cylindrical metal air battery according to the present invention mainly includes an external case 100, an internal case 200 and an elastic sealing means 300. The internal case 200 is inserted into the external case 100, and the elastic sealing means 300 is provided between the external case 100 and the internal case 200, thus sealing or opening the internal case 200 from or to the outside and thereby controlling the inflow and outflow of air.

First, the external case 100 is formed in a cylindrical shape, and determines the size and shape of the entire battery. A cathode terminal 110 is provided on a first end of the external case 100, and an anode terminal hole 120 is formed in a second end of the external case to receive an anode terminal 210 that will be described below. That is, the cathode terminal 110 and the anode terminal 210 are exposed to the outside of the external case 100. Here, the cathode terminal 110 is not integrated with the external case 100, but the cathode terminal is supported in the external case 100 by a support unit 400 that will be described below, in such a way that the cathode terminal is exposed to the outside through the first end of the external case 100.

The internal case 200 has a cylindrical shape which has a diameter relatively smaller than that of the external case 100, so that the internal case is coaxially inserted into the external case 100. The anode terminal 210 is provided on the second end in which the anode terminal hole 120 is formed, thus allowing the anode terminal 210 to move into and out of the anode terminal hole 120. Further, air inflow holes 220 are formed in a wall of the internal case 200 to permit the inflow of air, thus being supplied with oxygen serving as the anode active material of the metal air battery. It is preferable that the internal case 200 be made of a conductive metallic material and be integrated with the anode terminal 210.

Further, the internal case 200 is accommodated in the external case 100, is supported at one end thereof by a support unit 400 which is provided between the internal case and the external case 100 and will be described below, and is coupled to the elastic sealing means 300, so that the internal case is elastically moved by the action or release of pressurizing force.

A current collecting bar 230 is provided in the internal case 200, is electrically insulated from the internal case 200 and is electrically connected to the cathode terminal 110. A plurality of thorn-shaped current collecting needles 231 is provided on the current collecting bar 230 to increase current collecting efficiency, thus enhancing the oxidation-reduction reaction efficiency of the battery, and allowing the reaction to be stably performed.

The support unit 400 is provided between the external case 100 and the internal case 200, thus supporting the cathode terminal 110 and the current collecting bar 230 while insulating them from the external case 100, and supporting the elastic sealing means 300 between the support unit and the internal case 200. The support unit 400 has a thickness that conforms to a gap between the external case 100 and the internal case 200, and has a '⊢ ⊣'-shaped cross-section. The upper portion of the support unit supports the cathode terminal 110 on the external case 100 while insulating the cathode terminal from the external case, thus supporting an end of the current collecting bar 230. The lower portion of the support unit supports the elastic sealing means 300, thus guiding the internal case 200 which is moved by the elastic sealing means 300.

Further, the elastic sealing means 300 is provided on the first end of the internal case 200. Thus, in the case of inserting the battery into the battery compartment, the anode terminal 210 integrated with the internal case 200 is elastically pressed, that is, is pressed by an anode terminal contact part of the battery compartment, thus forming a gap between the anode terminal hole 120 of the external case 100 and the internal case 200.

Air flows through the gap into the air inflow holes 220 of the internal case 200. When the battery is separated from the battery compartment, the anode terminal 210 returns to its original position, so that the anode terminal hole 120 is sealed by the internal case 200, thus preventing air from flowing into the battery.

Thereby, when the battery is inserted into the battery compartment, that is, when the battery is in use, air continues to flow into the anode terminal hole 120 and the air inflow holes 220, so that the oxidation-reduction reaction of the battery is conducted. In contrast, when the battery is separated from the battery compartment, that is, when the battery is not in use, the supply of air to the air inflow holes 220 is blocked, thus preventing the electric discharge of the battery, therefore increasing the storage performance of the battery.

The elastic sealing means 300 preferably comprises a spring, which is provided between a rear end of the internal case 200 and the support unit 400 and is made of an elastic material. The elastic sealing means may be made of elastic rubber or synthetic resin as necessary. If the internal case 200 is pressed, the spring is compressed. Meanwhile, if the pressurizing force is released from the internal case 200, the spring is restored to its original state, so that the internal case 200 is moved. Therefore, the anode terminal hole 120 is sealed or opened, so that the supply of air to the air inflow holes 220 is controlled.

The elastic sealing means 300 further includes a sealing member 310 at a position adjacent to the anode terminal 210 of the internal case 200. Thus, when the spring is restored to its original state by releasing the pressurizing force, the sealing force of the anode terminal hole 120 is further improved.

When the metal air battery having the double structure with the external case 100 and the internal case 200 as such is in use, air flows into the air inflow holes 220 of the internal case 200. Meanwhile, when the battery is not in use, the air inflow holes 220 of the internal case 200 are isolated from the outside, thus preventing the electric discharge of the battery, and improving the storage performance of the battery, therefore allowing the battery to be used for a lengthy period of time.

As described above, the present invention provides a pressing-type cylindrical metal air battery, which has a double structure with an external case and an internal case, so that an air inflow hole of the internal case can be opened to or sealed from the outside when the battery is inserted into or separated from a battery compartment, thereby blocking the inflow of air when the battery is not in use.

What is claimed is:

1. A metal air battery, comprising:
    an external case formed in a cylindrical shape, and having a cathode terminal at a first end thereof and an anode terminal hole at a second end thereof;
    an internal case formed in a cylindrical shape, coaxially received in the external case, and having at a first end thereof an anode terminal, the internal case being moveable in a coaxial direction within the external case and having air inflow holes formed in a cylindrical wall portion of the internal case to permit inflow of air therethrough; and
    elastic sealing means provided at a second end of the internal case, the elastic sealing means enabling the internal case to elastically move in the coaxial direction and thereby causing the anode terminal to elastically move into the anode terminal hole and allow the air to flow into the anode terminal hole and into the air inflow holes of the internal case as the anode terminal is elastically pressed when the battery is inserted into a battery compartment, the elastic sealing means further enabling sealing the anode terminal hole to block the air from flowing through the anode terminal hole and through the air inflow holes of the internal case as the anode terminal elastically restores its initial position when the battery is separated from the battery compartment.

2. The metal air battery according to claim 1, wherein the internal case further comprises therein a current collecting bar which is electrically connected to the cathode terminal.

3. The metal air battery according to claim 2, wherein a plurality of current collecting needles are formed on the current collecting bar.

4. The metal air battery according to claim 2, further comprising:
    a support unit provided within the external case and holding the second end of the internal case, the support unit supporting the cathode terminal and the current collecting bar while insulating them from the external case, and supporting the elastic sealing means between the support unit and the internal case.

5. The metal air battery according to claim 4, wherein the elastic sealing means comprises a spring between the second end of the internal case and the support unit.

6. The metal air battery according to claim 1, wherein the elastic sealing means further comprises a sealing member at a position adjacent to the anode terminal of the internal case.

7. The metal air battery according to claim 5, wherein the elastic sealing means further comprises a sealing member at a position adjacent to the anode terminal of the internal case.

\* \* \* \* \*